United States Patent
Poscharnig et al.

(10) Patent No.: US 11,121,429 B2
(45) Date of Patent: Sep. 14, 2021

(54) BATTERY MODULE AND VEHICLE INCLUDING THE SAME

(71) Applicant: Samsung SDI Co., Ltd., Yongin-si (KR)

(72) Inventors: Guido Poscharnig, Stattegg (AT); Gernot Zavcar, Graz (AT); Gerhard Steiner, Hart bei Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 160 days.

(21) Appl. No.: 16/470,449

(22) PCT Filed: Dec. 13, 2017

(86) PCT No.: PCT/KR2017/014599
§ 371 (c)(1),
(2) Date: Jun. 17, 2019

(87) PCT Pub. No.: WO2018/128294
PCT Pub. Date: Jul. 12, 2018

(65) Prior Publication Data
US 2019/0312238 A1    Oct. 10, 2019

(30) Foreign Application Priority Data

Jan. 6, 2017 (EP) .................................... 17150496
Dec. 12, 2017 (KR) ........................ 10-2017-0170681

(51) Int. Cl.
*H01M 50/20* (2021.01)
*H01M 50/209* (2021.01)
(Continued)

(52) U.S. Cl.
CPC ......... *H01M 50/20* (2021.01); *H01M 50/207* (2021.01); *H01M 50/209* (2021.01);
(Continued)

(58) Field of Classification Search
CPC ............... H01M 50/20; H01M 50/207; H01M 50/209; H01M 50/24; H01M 50/249; H01M 50/271; B60L 50/50; B60L 50/64
See application file for complete search history.

(56) References Cited

U.S. PATENT DOCUMENTS

| | | | |
|---|---|---|---|
| 2004/0121226 A1 | 6/2004 | Kaelin et al. | |
| 2011/0052965 A1* | 3/2011 | Kim ................. | H01M 10/6556 429/156 |

(Continued)

FOREIGN PATENT DOCUMENTS

| | | |
|---|---|---|
| CN | 1567105 A | 1/2005 |
| CN | 103138028 A | 6/2013 |

(Continued)

OTHER PUBLICATIONS

EPO website (www.espacenet.com) machine translation of the detailed description of JP 2010198818A (Year: 2010).*

(Continued)

*Primary Examiner* — Gregg Cantelmo
(74) *Attorney, Agent, or Firm* — Lewis Roca Rothgerber Christie LLP (57) ABSTRACT

A battery module and a vehicle including the same are disclosed. According to an exemplary embodiment of the present invention, the battery module may include: a plurality of battery cells; a housing configured to include a base plate, a housing frame, and a cover plate; and a gasket interposed between the housing frame and the base plate and between the housing frame and the cover plate, wherein an upper flange of the housing frame facing the cover plate and a lower flange of the housing frame facing the base plate have a step shape forming a recess portion opened to an inner side of the housing plate, and the gasket is disposed in the recess portion.

15 Claims, 7 Drawing Sheets

(51) Int. Cl.
    *H01M 50/271*    (2021.01)
    *H01M 50/249*    (2021.01)
    *H01M 50/24*     (2021.01)
    *H01M 50/207*    (2021.01)
    *H01M 10/6554*   (2014.01)

(52) U.S. Cl.
    CPC ......... *H01M 50/24* (2021.01); *H01M 50/249* (2021.01); *H01M 50/271* (2021.01); *H01M 10/6554* (2015.04); *H01M 2220/20* (2013.01)

(56) References Cited

U.S. PATENT DOCUMENTS

| | | | |
|---|---|---|---|
| 2012/0114999 | A1 | 5/2012 | Park et al. |
| 2012/0164500 | A1 | 6/2012 | Loo et al. |
| 2013/0252058 | A1 | 9/2013 | Kim |
| 2014/0106211 | A1 | 4/2014 | Lee et al. |
| 2017/0018747 | A1* | 1/2017 | Yamada .............. H01M 10/625 |

FOREIGN PATENT DOCUMENTS

| | | | | |
|---|---|---|---|---|
| CN | 204333063 | U | | 5/2015 |
| EP | 2 385 274 | A1 | | 11/2011 |
| EP | 2 595 216 | A1 | | 5/2013 |
| JP | 2010-198818 | A | | 9/2010 |
| JP | 2010198818 | A | * | 9/2010 |
| JP | 2013-214354 | A | | 10/2013 |
| JP | 5528772 | B2 | | 6/2014 |
| KR | 10-1029837 | B1 | | 4/2011 |
| KR | 10-1191659 | B1 | | 10/2012 |
| KR | 10-1243371 | B1 | | 3/2013 |
| KR | 10-2013-0107790 | A | | 10/2013 |
| KR | 10-2015-0083497 | A | | 7/2015 |
| KR | 10-2016-0116566 | A | | 10/2016 |
| WO | WO-2015151866 | A1 | * | 10/2015 ........ H01M 10/6554 |

OTHER PUBLICATIONS

Extended European Search Report for corresponding European Patent application No. 17150496.2, dated Mar. 28, 2017, 9pp.

"ISO 3601 Metric Size O-Rings Quick Reference Chart", Sep. 18, 2015, http://www.applerubber.com/src/pdf/iso-3601-metric-size-o-rings.pdf, 6pp.

Chinese Office action issued in corresponding application No. CN 201780082495.9, dated Jul. 8, 2021, 16 pages (including English Translation).

* cited by examiner

BATTERY MODULE AND VEHICLE INCLUDING THE SAME

CROSS-REFERENCE TO RELATED APPLICATION(S)

This application is a National Phase Patent Application of International Patent Application Number PCT/KR2017/014599, filed on Dec. 13, 2017, which claims priority of European Patent Application No. 17150496.2, filed Jan. 6, 2017 and Korean Patent Application No. 10-2017-0170681, filed Dec. 12, 2017. The entire contents of all of which are incorporated herein by reference.

TECHNICAL FIELD

The present invention relates to a battery module and a vehicle including the same, and more particularly, to a battery module in which a gasket of a battery module housing has a specific design, and a vehicle including the same.

BACKGROUND ART

A rechargeable battery differs from a primary battery in that charging and discharging can be repeated, and the primary battery only provides non-reversible conversion from chemical energy to electrical energy.

A low-capacity rechargeable battery is used as a power source for small electronic devices such as portable telephones, laptops, computers, and camcorders, and a high-capacity rechargeable battery is used as a power source for vehicles.

The rechargeable battery may include an electrode assembly including a positive electrode, a negative electrode, and a separator interposed between the positive electrode and the negative electrode, a case for accommodating the electrode assembly therein, and an electrode terminal electrically connected to the electrode assembly.

An electrolyte solution is injected into the case to enable the battery to be charged and discharged by an electrochemical reaction of the positive electrode, the negative electrode, and the electrolyte solution. For example, a shape of the case, which may be cylindrical or rectangular, may be different depending on the use of the battery.

The rechargeable battery is used in the form of a battery module including a plurality of unit battery cells connected in series or in parallel, thereby providing high energy density for running, e.g., a hybrid vehicle.

That is, the battery module may interconnect a plurality of unit battery cells depending on an amount of power required to realize a high-power rechargeable battery such as for an electric vehicle. A large-sized battery system used in an electric vehicle may include 3 to 1000 battery cells. Such battery cells may be provided as a plurality of battery modules in each of which 10 to 20 battery cells are included in a general housing.

The battery module may be configured as a block type or a module type. In the case of the block type, each battery may be coupled to a common current collector and a common battery management system, and may have a housing.

In the case of the module type, a plurality of battery cells are connected to constitute a submodule, and a plurality of submodules are connected to constitute one of the modules. A battery management function may be implemented at least partially at a module or submodule level, thereby improving compatibility.

The one or more battery modules may be mechanically and electrically integrated, mounted with a thermal management system, and connected to one or more electrical consumption devices to constitute a battery system.

The battery system may have three major sealing areas, such as a housing gasket, a gasket for an electronic device such as a connector, and a gasket for a cooling system. The housing gasket protects an interior space of the housing from liquid or dust during an entire cycle life of the battery system, and protects its environment from high voltages.

When applied to vehicles, the battery should be able to withstand a pressure of about 10,000 Pa for a minimum of 30 minutes, prevent inflow of dust, and the like. Furthermore, the housing gasket should have good durability against contamination by oil or contact of the electrolyte solution leaking from the battery cell.

On the other hand, the housing gasket must be capable of opening and closing so that simple defects such as a loose coupling of a cooling pipe may be corrected. In addition, for a design of the housing gasket, a material and a surface structure of the housing need to be considered.

In a continuous production process, such as serial production, optimization of the manufacturing process for each housing gasket is required. For example, the housing may include an auxiliary constituent element for accelerating a fastening process.

The housing of the battery may include three constituent elements, i.e., a base plate, a housing frame, and a cover plate. A foam gasket may be provided in a groove or a plane between the above-described constituent elements of the housing.

A component in which the gasket is provided has a flat surface to prevent damage to the gasket, and the gasket is mainly provided in the housing frame in consideration of spatial limitations.

As a result, the housing frame may include gaskets in an upper flange and a lower flange by using a special and expensive workpiece in the manufacturing process so as to prevent damage to the foam gasket.

In addition, since a tolerance for assembling the gasket is small and a defect rate is high, it is difficult to accelerate a transfer speed in the machining process in consideration of the tolerance, and it may be expensive to process a groove for providing the gasket.

The above information disclosed in this Background section is only for enhancement of understanding of the background of the invention, and therefore it may contain information that does not form the prior art that is already known in this country to a person of ordinary skill in the art.

DISCLOSURE

Technical Problem

Exemplary embodiments of the present invention have been made in an effort to provide a battery module with a housing which can be formed by a simple process using a low-cost configuration, and a vehicle including the same.

Technical Solution

An exemplary embodiment of the present invention provides a battery module including: a housing configured to include a base plate, a housing frame, and a cover plate; two or more battery cells; and a gasket interposed between the housing frame and the base plate and between the housing frame and the cover plate.

In the battery module, an upper flange of the housing frame and a lower flange of the housing frame have a stepped shape to form a recessed portion that is opened toward an inner side of the housing frame, and the gasket is disposed in the recess portion. The upper flange may face the cover plate, and the lower flange may face the base plate.

An exemplary embodiment of the present invention provides a battery module having an upper portion and a lower portion, each of which has a recess portion or a gasket rim that communicates with (that is opened toward) an interior space of the housing frame. The gasket may be seated in the recess portion.

Specifically, the gasket may be interposed between a bottom surface of the recess portion and the base plate or the cover plate.

In the present invention, the gasket disposition ensures sufficient sealing of the housing against leakage of an electrolyte solution or coolant from the inside of the housing to the outside, or against inflow of water or oil from the outside of the housing to the inside.

In addition, in the present invention, the gasket disposition may have an effect of protection against electromagnetic influences, in particular, protection against electromagnetic interference (EMC/EMI protection). In the present invention, the recess portion may accomplish a higher transfer speed in a machining process in consideration of tolerance or the like compared to a general groove which is not opened to the interior space of the housing.

According to the exemplary embodiment of the present invention, the gasket may be attached to the base plate or the cover plate. Thus, the gasket may include an adhesive layer, or may be provided with a material having at least a temporary adhesion characteristic.

When the gasket is disposed on the base plate and the cover plate, the handling of the gasket provided on the base plate and the cover plate is reduced, considering that the base plate and the cover plate are assembled as one of the final steps in the assembling process. Therefore, damage to the gasket may be effectively prevented in the assembling process of the battery module.

In addition, it is not necessary to provide a conventional jig for handling the gasket while preventing damage to the gasket during the assembly process, thereby reducing the cost of the manufacturing process.

The gasket may be, e.g., a foam gasket, and a foaming agent forming the gasket may be provided directly on the base plate and the cover plate.

A conventional gasket is cut from flat sheets to allow sealing between a plurality of surfaces, while a form-in-place foam gasket (FIPFG) is provided directly on any one surface without such a forming process. Therefore, it is possible to greatly reduce the manufacturing time and cost.

In the FIPFG process, a liquid blowing agent is generally used. A thixotropic characteristic of the foaming agent may ensure stable sealing even in complex and atypical regions.

In other words, it is possible to realize a complicated three-dimensional sealing shape and an irregular cross-section change by using robot technology that is suitable for a product which requires sealing, and to stably seal the same.

According to another embodiment of the present invention, the width of the recess portion is in a range of 1:5 to 1:2 with respect to the total width in each of the upper flange and the lower flange.

Implementing dimensions of the recess portion within this range ensure mechanical integrity of the housing frame. When the ratio is more than 1:2, the flange may not have sufficient mechanical integrity. When the ratio is less than 1:5, the flange is too small to properly seat the gasket.

The total width of the upper flange is defined as a distance from the inner side of the housing frame to the outer side of the housing frame. The upper frame represents a small portion of the housing that directly faces or contacts the inner surface of the cover plate.

In a relationship that may be independent of, but in combination with, the foregoing exemplary embodiment, the width of the recess portion may be set in a range of 3:1 to 1.2:1 with respect to the width of the gasket.

Thus, a desirable disposition between the respective components of the housing may be achieved within a wider tolerance than a general groove which is not opened toward the inner space of the housing. As a result, a proportion of defective products can be reduced.

When the ratio is more than 3:1, the manufacturing cost for forming the recess portion may be increased without improving the sealing function of the gasket. When the ratio is less than 1.2:1, inconsistency between the gasket and the recess portion may occur in the process, resulting in an increase in manufacturing loss.

According to another exemplary embodiment, which may be combined with any or all of the above exemplary embodiments, the depth of the recess portion is in a range of 1:1.1 to 1:2 with respect to the height of the gasket.

That is, the height of the gasket is slightly larger than the depth of the recess portion. For the purpose of the present invention, the gasket may generally be formed of an elastic material, thus ensuring stable sealing even when the tolerance is further increased. In addition, a proportion of the coupled product may be reduced.

When the ratio is less than 1:1.1, the gasket may not sufficiently seal the housing, and when the ratio is more than 1:2, the coupling between the housing frame and the base plate or the cover plate may not be properly performed.

According to another exemplary embodiment of the present invention, the recess portion may include a flange surface extending vertically on the inner side of the housing frame, and a circumferential protrusion may be provided on the flange surface of the recess portion.

The gasket may be disposed such that its center is positioned at an upper portion of the circumferential protrusion. The circumferential protrusion may have a height h2, and the recess portion may have a height h3. A ratio of the height h3 to the height h2 may be in a range of 2:1 to 5:1.

As a result, the entire sealing surface of the gasket may be significantly increased. When the ratio is more than 5:1, the sealing surface may not increase. When the ratio is less than 2:1, the housing may not be closed properly.

An exemplary embodiment of the present invention provides a vehicle including the aforementioned battery module.

Advantageous Effects

As described above, according to the exemplary embodiments of the present invention, it is possible to effectively reduce the manufacturing cost, to improve efficiency of the processes, and to improve sealing performance of the housing.

MODE FOR INVENTION

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, redundant descriptions for the same constituent elements will be omitted.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

It is also to be understood that the terminology used herein is only for the purpose of describing particular embodiments, and is not intended to be limiting of the invention. Singular forms are to include plural forms unless the context clearly indicates otherwise.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

In addition, as used herein, the term "and/or" includes any plurality of combinations of items or any of a plurality of listed items. In this specification, "A or B" may include "A", "B", or "A and B".

Figure 1:
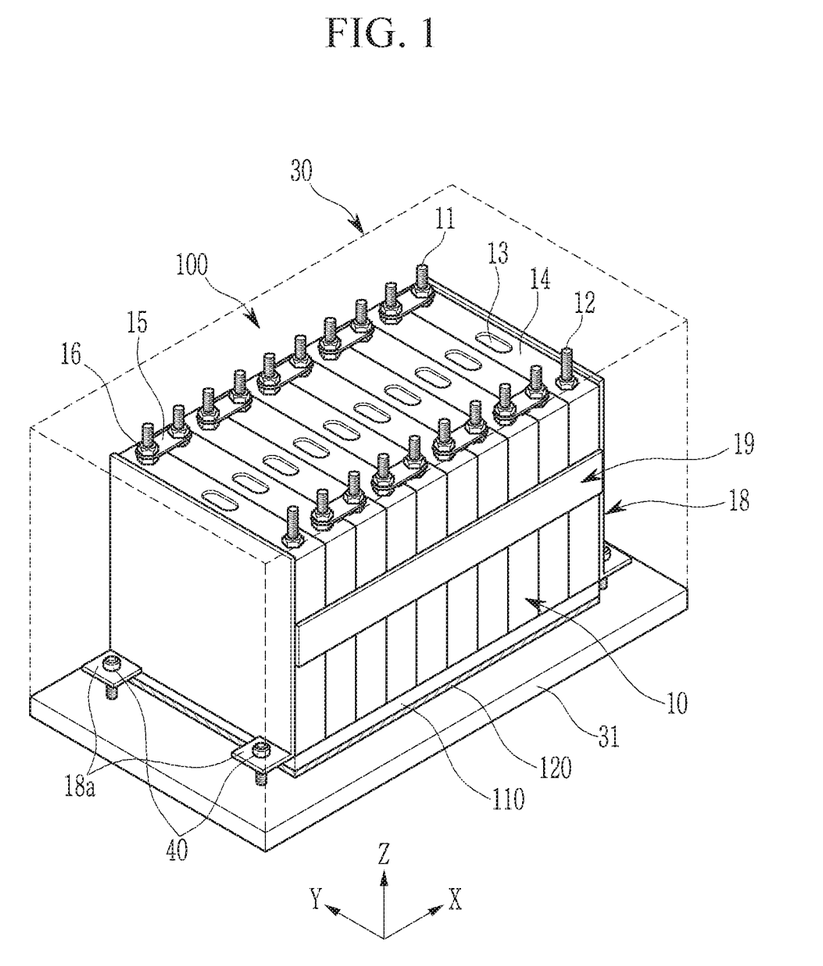
FIG. 1 illustrates a perspective view of a battery module according to an exemplary embodiment of the present invention.

As illustrated in FIG. 1, a battery module 100 may include a plurality of battery cells 10 arranged in one direction, and a heat exchange member 110 provided adjacent to lower surfaces of the battery cells 10.

A pair of end plates 18 are provided so as to face wide surfaces of the battery cells 10 outside of the battery cells 10, and a connection plate 19 is provided to connect the pair of end plates 18 so as to fix the battery cells 10 together. Fastening portions 18a provided at opposite sides of the battery module 100 are fastened to a base plate 31 by bolts 40. The base plate 31 constitutes a bottom surface of a housing 30. Other constituent elements of the housing, such as a cover plate and a housing frame, are not illustrated in FIG. 1.

An elastic member 120 made of an elastic material such as rubber may be interposed between the base plate 31 and the heat exchange member 110. Herein, each of the battery cells 10 may have an angular shape (or rectangular shape), and the battery module 100 is formed by stacking the battery cells 10 on top of wide surfaces thereof.

In addition, each battery cell 10 includes a battery case configured to accommodate an electrode assembly and an electrolyte therein. The battery case is closed and sealed by a cap assembly 14.

The cap assembly 14 includes a positive terminal 11 and a negative terminal 12 having different polarities, and a vent 13. The vent 13 corresponds to a safety means of each battery cell 10, and serves as a passage through which gas generated in the battery cell 10 is discharged to the outside of the battery cell 10

A positive terminal 11 and a negative terminal 12 of battery cells 10 adjacent to each other may be electrically connected through a bus bar 15, and the bus bar 15 may be fixed by a nut 16 or the like. Accordingly, the battery module 100 may be provided by electrically connecting the plurality of battery cells 10 in a bundle, and may be used as a power source unit.

A rechargeable battery, particularly a rechargeable lithium battery, may be used as the battery cells 10. The battery module 100 may be a 48 V battery for a vehicle.

Figure 2:
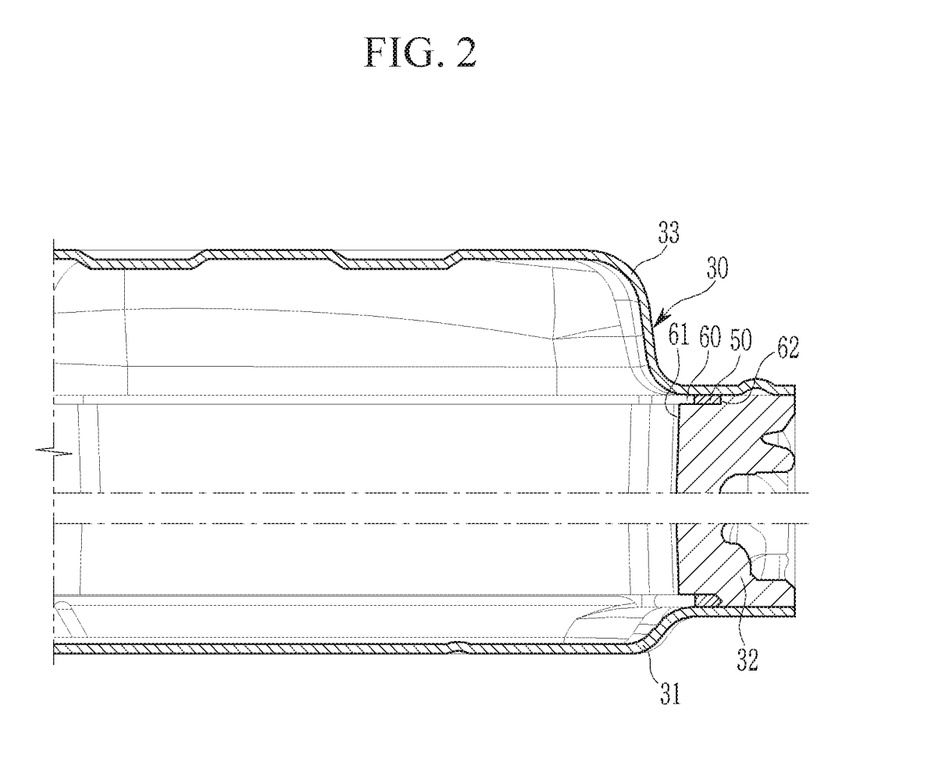
FIG. 2 illustrates a partially exploded cross-sectional view of a battery module housing according to an exemplary embodiment of the present invention.

FIG. 2 illustrates a cross-sectional view of the housing 30 according to an exemplary embodiment of the present invention. The housing 30 includes the base plate 31, a housing frame 32, and a cover plate 33.

Each component of the housing 30 may be made of a rigid material, e.g., a metal such as stainless steel or aluminum. The housing frame 32 includes an upper flange configured to face an inner surface of the cover plate 33 and a lower flange configured to face an inner surface of the base plate 31.

A gasket 50 may be interposed between the housing frame 32 and the cover plate 33 and between the housing frame 32 and the base plate 31. In particular, the gasket 50 may be disposed in a recess portion 60 that communicates with or is opened toward the interior space of the housing 30 at the upper flange and the lower flange.

According to the present exemplary embodiment, the recess portion 60 includes a flange surface 61 and an end surface 62. The gasket 50 may be disposed to be in close contact with the end surface 62 of the recess portion 60, but the present invention is not limited thereto.

Herein, the flange surface 61 may extend substantially perpendicular to the inner surface of the housing frame 32, while the end surface 62 may extend substantially in a same direction as the inner surface of the housing frame 32.

However, the flange surface 61 and the end surface 62 need not be limited thereto. The recess portion 60 may be easily formed at a high speed in a separate machining process.

The gasket 50 may be formed of an elastic material, e.g., an elastomer such as a polyolefin ethylene-propylene-diene-monomer (EPDM). According to an exemplary embodiment of the present invention, the gasket 50 may be a foam gasket. The gasket 50 may be attached to the inner surfaces of the base plate 31 and the cover plate 33.

Thus, the gasket 50 may be at least temporarily adherent or may include an adhesive film (not illustrated) provided between the base plate 31 and the cover plate 33.

For example, the gasket 50 may be a tape including an adhesive surface, and the tape may be adhered to the base plate 31 and the cover plate 33 before a finishing process of the housing 30.

According to the exemplary embodiment of FIG. 1, as illustrated in FIG. 2, the recess portion 60 has a width of about one third with respect to an entire width of the upper flange of the housing frame 32. The recess portion 60 of the lower flange facing the base plate 31 also has the above dimensions, but the present invention is not limited thereto.

Further, a ratio of a width of the gasket 50 to a width of the recess portion 60 is about 1:2 according to the embodiment of the present invention. Since the gasket 50 may be made of an elastic material, a height of the gasket 50 may be 1.1 to 2 times the height of the gasket 50 to ensure reliable sealing of the inner space of the housing 30.

Figure 3:
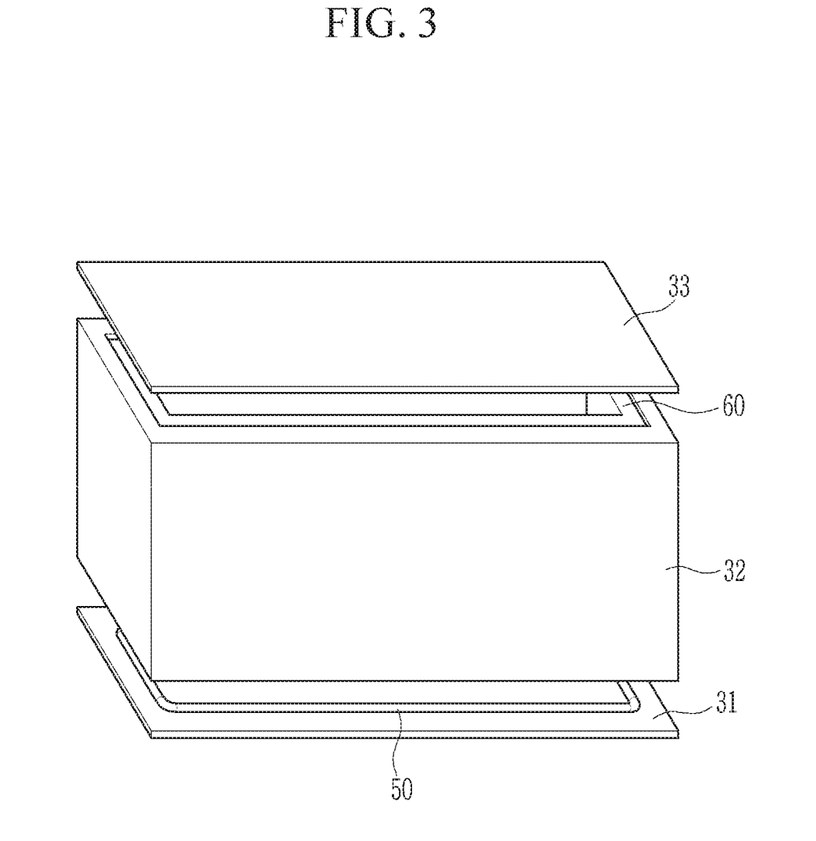
FIG. 3 illustrates an exploded perspective view of a housing according to another exemplary embodiment of the present invention.

FIG. 3 illustrates an exploded perspective view of the housing 30 according to another exemplary embodiment of the present invention. The cover plate 33 is illustrated to be translucent for visibility in the drawing.

Herein, the gasket 50 attached to the inner surface of the base plate 31 and the cover plate 33 has a shape of a columnar tape (strip shape). During a manufacturing process, the housing frame 32 is disposed at an upper side of the base plate 31, and the cover plate 33 is disposed at an upper side of the housing frame 32.

Figure 4:
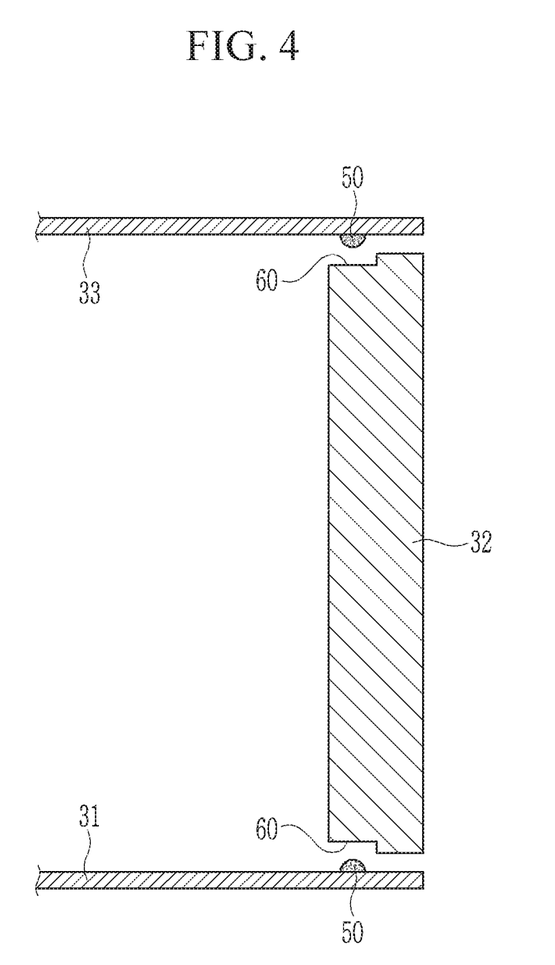
FIG. 4 illustrates a partially exploded cross-sectional view of a housing illustrated in FIG. 1.

FIG. 4 illustrates a cross-sectional view of a portion of the housing 30 illustrated in FIG. 4. Herein, a ratio of a width of each recess portion 60 to an entire width of the upper and lower flanges of the housing frame 32 is about 1:2. The gasket 50 is disposed in the recess portion 60 to seal the inner space of the housing 30 by coupling of the base plate 31, the housing frame 32, and the cover plate 33.

Figure 5:
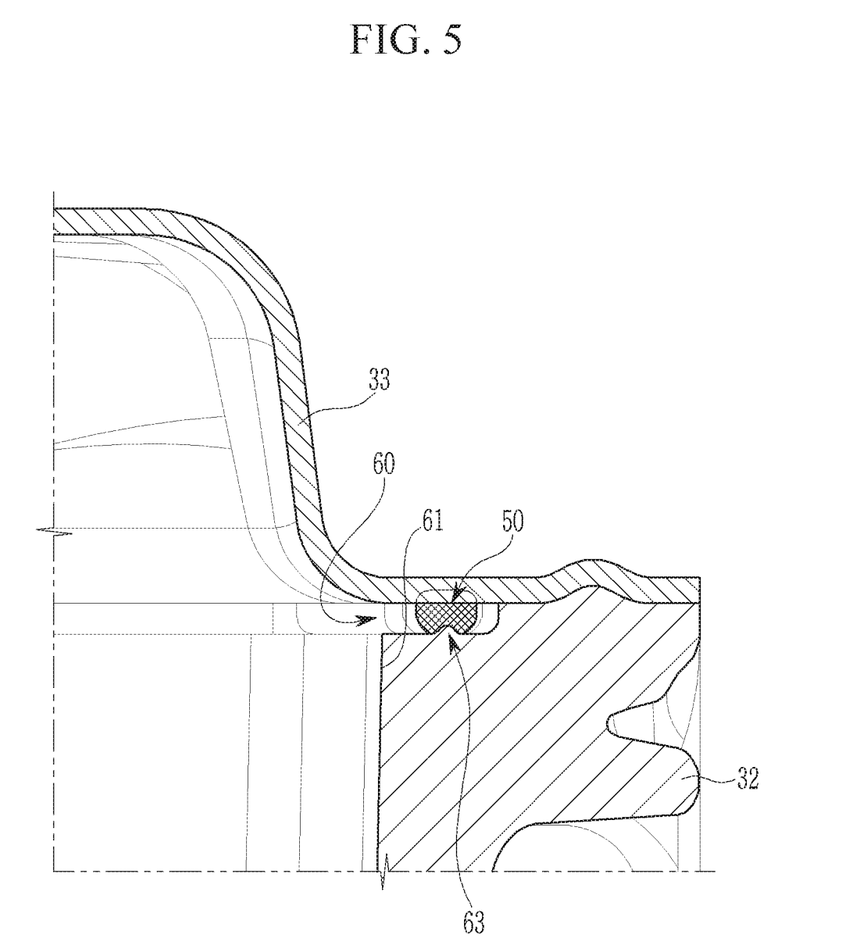
FIG. 5 illustrates a partially exploded cross-sectional view of a housing according to another exemplary embodiment of the present invention.
Figure 6:
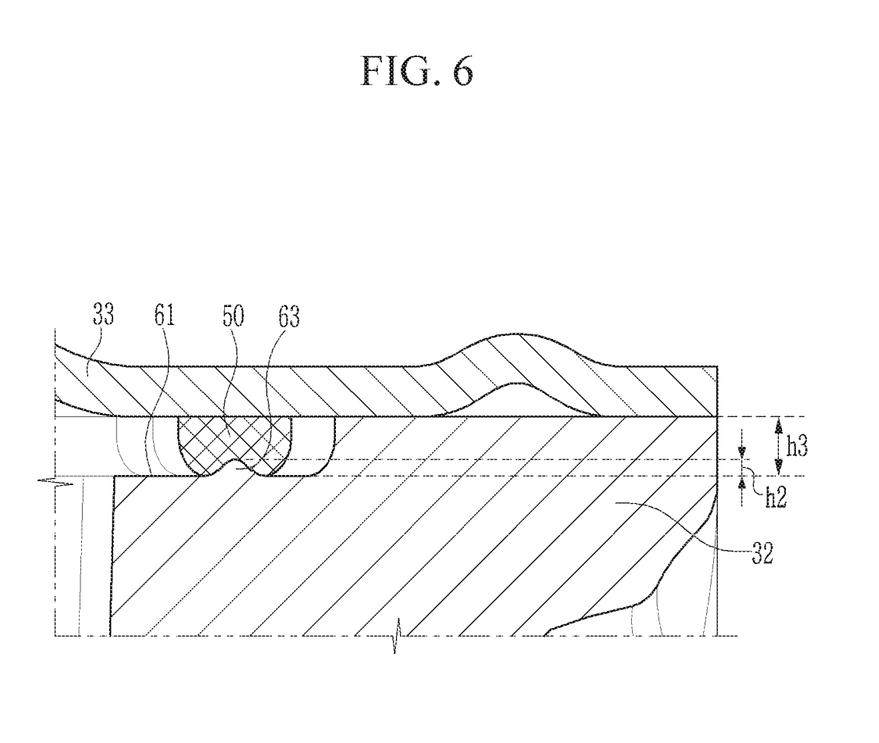
FIG. 6 illustrates an enlarged view of a portion according to the exemplary embodiment illustrated in FIG. 5.
Figure 7:
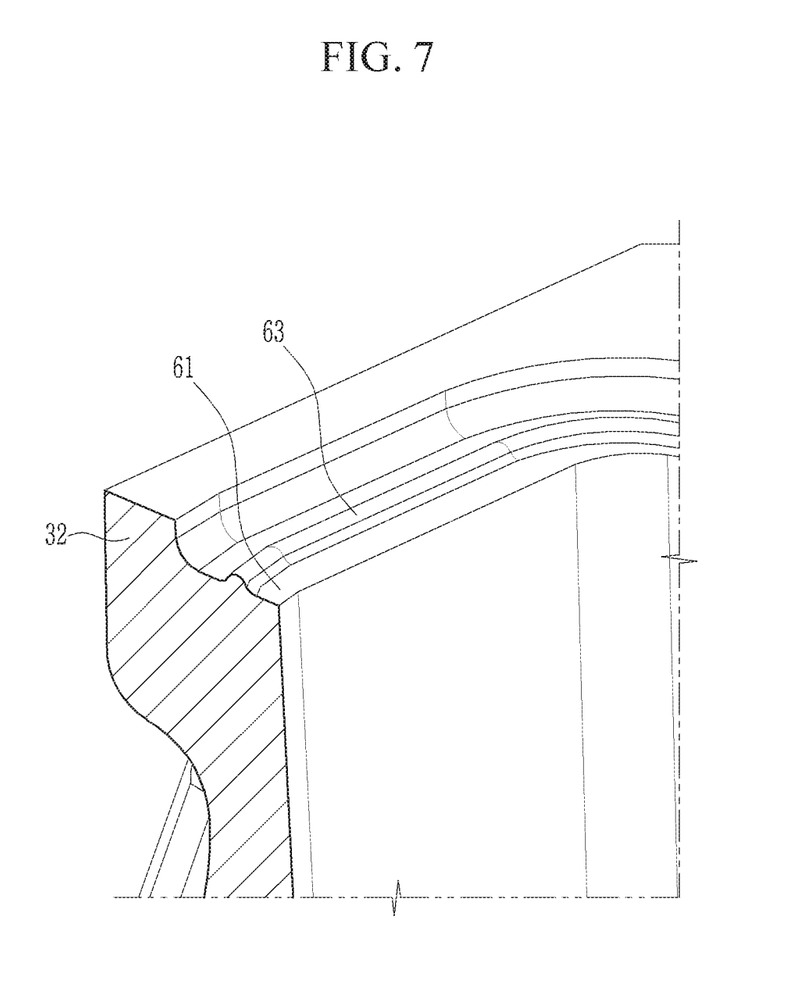
FIG. 7 illustrates a perspective view of an upper flange in a housing frame according to the exemplary embodiment illustrated in FIG. 5.

FIG. 5 illustrates a cross-sectional view of a portion of the housing 30 according to another exemplary embodiment of the present invention. FIG. 6 illustrates an enlarged view of FIG. 5. FIG. 5 illustrates the upper flange of the housing frame 32 including the recess portion 60 and the gasket 50.

Basically, FIG. 5 follows the exemplary embodiment of FIG. 2 except that a circumferential protrusion 63 is provided on the flange surface 61 of the recess portion 60. The circumferential protrusion 63 may preferably be provided in a strip shape extending along the upper flange or the lower flange to form a closed curve, and the gasket 50 may be disposed at an upper center side of the circumferential protrusion 63.

A total sealing surface of the gasket 50 may be increased up to 20% by such a structure. The circumferential protrusion 63 has a height h2, and the recess portion 60 has a height h3. A ratio of the height h3 to the height h2 is preferably in a range of 2:1 to 5:1. In the exemplary embodiment illustrated in FIG. 6, the ratio is about 3.75:1, but the present invention is not limited thereto.

While the present invention has been particularly shown and described with reference to specific embodiments thereof, it will be understood by those skilled in the art that various changes in form and detail may be made therein without departing from the spirit and scope of the invention as defined by the following claims.

<Description of Symbols>

| | |
|---|---|
| 30: housing | 31: base plate |
| 32: housing frame | 33: cover plate |
| 50: gasket | 60: upper flange, lower flange |

<Description of Symbols>

| | |
|---|---|
| 61: flange surface | 62: end surface |
| 63: circumferential protrusion | |

The invention claimed is:

1. A battery module comprising:
a plurality of battery cells;
a housing accommodating the battery cells and being configured to include a base plate, a housing frame, and a cover plate; and
a first gasket interposed between the housing frame and the base plate; and
a second gasket interposed between the housing frame and the cover plate,
wherein an lower flange of the housing frame facing the base plate has a step shape forming a first recess portion opened to an inner side of the housing frame,
wherein an upper flange of the housing frame facing the cover plate has a step shape forming a second recess portion opened to the inner side of the housing frame, and
wherein the first gasket is disposed in the first recess portion, and the second gasket is disposed in the second recess portion.

2. The battery module of claim 1, wherein the first gasket is attached to the base plate, and the second gasket is attached to the cover plate.

3. The battery module of claim 2, wherein the first and second gaskets are foam gaskets formed by providing a foaming agent to the base plate and the cover plate, respectively.

4. The battery module of claim 1, wherein a width of the first and second recess portions have a range of 1:5 to 1:2 with respect to a total width of the lower flange and the upper flange, respectively.

5. The battery module of claim 1, wherein a width of the first and second recess portions have a range of 3:1 to 1.2:1 with respect to a width of the first and second gaskets, respectively.

6. The battery module of claim 1, wherein a depth of the first and second recess portions have a range of 1:1.1 to 1:2 with respect to a height of the first and second gaskets, respectively.

7. The battery module of claim 1, wherein each of the first and second recess portions includes a flange surface extending in a direction intersecting the inner side of the housing frame and a circumferential protrusion disposed on the flange surface of the corresponding one of the first and second recess portions.

8. The battery module of claim 7, wherein the first and second gaskets are disposed at an upper side of the corresponding circumferential protrusions.

9. A vehicle comprising the battery module according to claim 1.

10. A battery module comprising:
a plurality of battery cells;
a housing configured to include a base plate, a housing frame, and a cover plate; and
a plurality of gaskets respectively interposed between the housing frame and the base plate and between the housing frame and the cover plate,
wherein an upper flange of the housing frame facing the cover plate and a lower flange of the housing frame facing the base plate have a step shape forming respective recess portions opened to an inner side of the housing plate, wherein the recess portions include a flange surface extending in a direction intersecting the inner side of the housing frame and a circumferential protrusion disposed on the flange surface of the recess portion, wherein the gaskets are at an upper side of the circumferential protrusion of the respective recess portions, wherein the circumferential protrusion has a height h2, and the recess portion has a height h3, and wherein a ratio of the height h3 to the height h2 is in a range of 2:1 to 5:1.

11. The battery module of claim 10, wherein the gaskets are attached to the base plate and the cover plate.

12. The battery module of claim 11, wherein the gaskets are foam gaskets formed by providing a foaming agent to each of the base plate and the cover plate.

13. The battery module of claim 10, wherein a width of the recess portion has a range of 1:5 to 1:2 with respect to a total width of the respective upper flange and the lower flange.

14. The battery module of claim 10, wherein a width of the recess portion has a range of 3:1 to 1.2:1 with respect to a width of the respective gasket.

15. The battery module of claim 10, wherein a depth of the recess portion has a range of 1:1.1 to 1:2 with respect to a height of the respective gasket.

* * * * *